United States Patent
Bolton

(10) Patent No.: US 6,262,652 B1
(45) Date of Patent: Jul. 17, 2001

(54) RESTRICTED ACCESS RECEIVER

(76) Inventor: Jonathan Bolton, 3/21 Bondi Rd, Bondi Junction NSW 2022 (AU)

( * ) Notice: Subject to any disclaimer, the term of this patent is extended or adjusted under 35 U.S.C. 154(b) by 0 days.

(21) Appl. No.: 08/793,459
(22) PCT Filed: Sep. 8, 1995
(86) PCT No.: PCT/AU95/00588
  § 371 Date: Mar. 30, 1998
  § 102(e) Date: Mar. 30, 1998
(87) PCT Pub. No.: WO96/08118
  PCT Pub. Date: Mar. 14, 1996

(30) Foreign Application Priority Data

Sep. 8, 1994 (AU) .................................................. PM8023

(51) Int. Cl.$^7$ ...................................................... G08B 5/22
(52) U.S. Cl. ........................... 340/7.2; 340/7.46; 340/5.8; 455/3.05
(58) Field of Search ................ 340/825.44, 825.34, 340/5.8, 825.47, 311.1, 7.46; 455/31.2, 31.1, 31.3, 38.1, 3.05

(56) References Cited

U.S. PATENT DOCUMENTS

| | | | |
|---|---|---|---|
| 5,146,217 | * | 9/1992 | Holmes et al. .................. 340/835.44 |
| 5,241,305 | * | 8/1993 | Fascenda et al. ............... 340/825.44 |
| 5,245,649 | * | 9/1993 | Eaton et al. .................... 340/825.44 |
| 5,257,307 | * | 10/1993 | Ise .................................. 340/825.44 |
| 5,430,892 | * | 7/1995 | Motegi ............................ 340/825.44 |
| 5,438,610 | * | 8/1995 | Bhagat et al. .................. 340/825.44 |

* cited by examiner

Primary Examiner—Brian Zimmerman
Assistant Examiner—Yves Dalencourt
(74) Attorney, Agent, or Firm—Vernon C. Maine; Scott J. Asmus

(57) ABSTRACT

A public pager messaging system with publicly accessible pager readout terminals distributed throughout the messaging system range, where each pager terminal is preprogrammed to recognize one or more specific capture codes that may be appended to a message, and to then accept and hold only those messages. A sender can create and append to a message either or both of a message code for one or a class of intended recipients, and a capture code consistent with the areas in which the recipients are likely to be found. The message code acts as a security lock on the message, making it inaccessible by recipients unless or until the necessary information about the message code is shared by sender with the intended recipients, so that the lock can be opened. The message may be accessible on multiple pager terminals. The message may be erased if not accessed within a preset time.

18 Claims, 3 Drawing Sheets

RESTRICTED ACCESS RECEIVER

INTRODUCTION

This invention concerns public access messaging, and in particular a public access messaging centre, a system for public access messaging and a method. Since the concept of public access messaging is believed to be original and the terminology is newly coined it will be explained below.

BACKGROUND OF THE INVENTION

The conventional telephone system has gained almost universal acceptance in developed countries, and widespread acceptance throughout the rest of the world. However, this technology is subject to the limitation that the two or more participants to a call must be present at respective telephones at the same time for a call to take place. Public telephones are provided for convenience of use when away from home or office telephones, but these telephones are only conveniently useful for making outgoing calls and are generally inconvenient for receiving incoming calls.

Telephone paging systems were introduced some years ago to enable a caller to send a simple message to a portable receiver which the recipient could carry around. Mobile telephony has subsequently been introduced to enable mobile callers to send and receive calls. As mobile telephone technology has achieved greater market penetration, a number of social penalties have become apparent. For instance, users are tempted to send and receive calls from potentially hazardous situations such as while driving automobiles, and this increases the hazard of that situation. Furthermore it is becoming more and more unacceptable to be disturbed in public places such as restaurants, by the ringing of mobile phones.

SUMMARY OF THE PRESENT INVENTION

In a first aspect the present invention concerns a public access messaging centre arranged to receive incoming messages from a communications network, wherein the messages are coded for one or more specific recipients and are able to be read out of the public access messaging centre by a recipient who enters an appropriate identifier.

It is envisaged that public access messaging centres will be widely available in public places, where members of the public can verify their identity by any suitable means in order to read out any messages received for them. The users will typically have a prearrangement to check for messages at particular occasions or on particular events occurring. The senders have the advantage that they do not require the recipients to be at any specific location in order to receive a message, or to receive the message at any particular time.

Furthermore since the messaging centre is a largely passive device it is not necessary for there to be any public annoyance by ringing tones or other noise pollution. The messaging centre is, consequently, conveniently for use by the hearing impaired.

The public access messaging may conveniently make use of existing paging system technology, and may even use existing paging systems such as POCSAG-compliant radio paging systems connected to the existing public switched telephone network (PSTN).

Since it is envisaged that receivers of messages may often want to use a telephone, the telephone companies can expect an increased benefit from conventional calls by the introduction of messaging centres, and in particular public telephones and messaging centres may be conveniently placed close to each other.

In existing paging systems the message is composed with a capture code dependent upon the destination receiver. In embodiments of the invention the message may be composed with a capture code dependent on the destination. The message will be received by all messaging centres within range, but will only be retained by those messaging centres which are programmed to receive messages carrying that capture code. Each messaging centre may retain messages having any one of a number of capture codes. One of the capture codes may be unique to the centre, others may be shared with groupings of centres, such as geographical or situational groupings.

In one option the messages are also composed with, for instance, an 8-digit message code inserted between the capture code and the message. This message code is used to verify the recipient's identity and allow retrieval of messages. In a very simple embodiment the message code may be the same as a PIN number to be entered into the messaging centre by the intended recipient.

In other situations it is quite possible that a message code need not necessarily identify a unique recipient, but could identify a class of recipients. And it is even feasible for public messages, such as advertising or community information, to be transmitted to the message centres. Message centres may be equipped with large format public displays for the convenient display of these messages.

On receipt at the messaging centre, the messages may be time-stamped and stored in a database as records. Subsequent messages with the same message code may be appended to pre-existing messages and stored as additional records within a file corresponding to the message code. Messages may be deleted from the database after they have been read out, or failing that after a predetermined period of time has elapsed.

In a second aspect the invention provides a public access messaging system comprising a public access paging system and one or more public access messaging centres as described above. The public access paging system may comprise a conventional radio paging system.

In a further embodiment the invention provides a method of operating a public access messaging system comprising the steps of:
  composing a message consisting of message data and a message code;
  transmitting the message;
  receiving the message;
  storing the message data in conjunction with the message code; and
  enabling read-out of the message data upon presentation of an identity code which is related in some meaningful way to the message code. The message may be time stamped upon receipt.

BRIEF DESCRIPTION OF THE DRAWINGS

The invention will now be described, by way of example only, with reference to the accompanying drawings, in which.

BEST MODE FOR CARRYING OUT THE INVENTION

Figure 1:
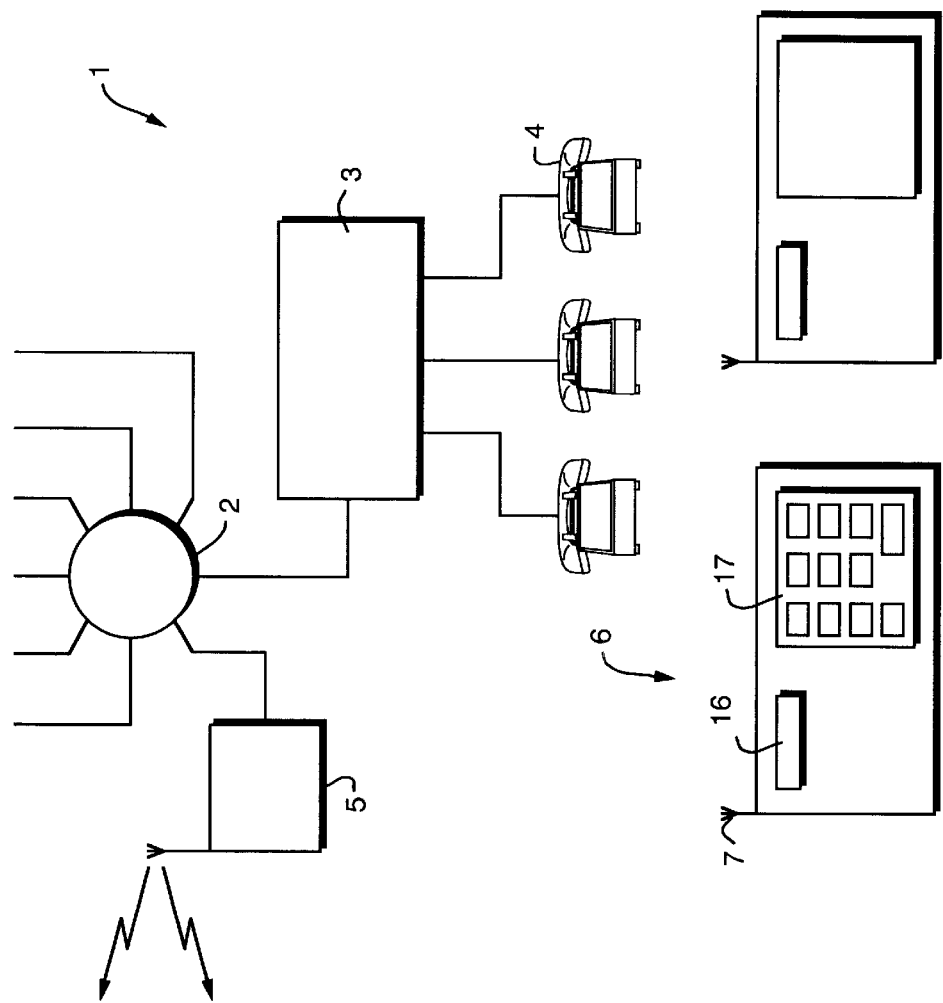
FIG. 1 is a schematic diagram showing a public access messaging system.
Figure 2:
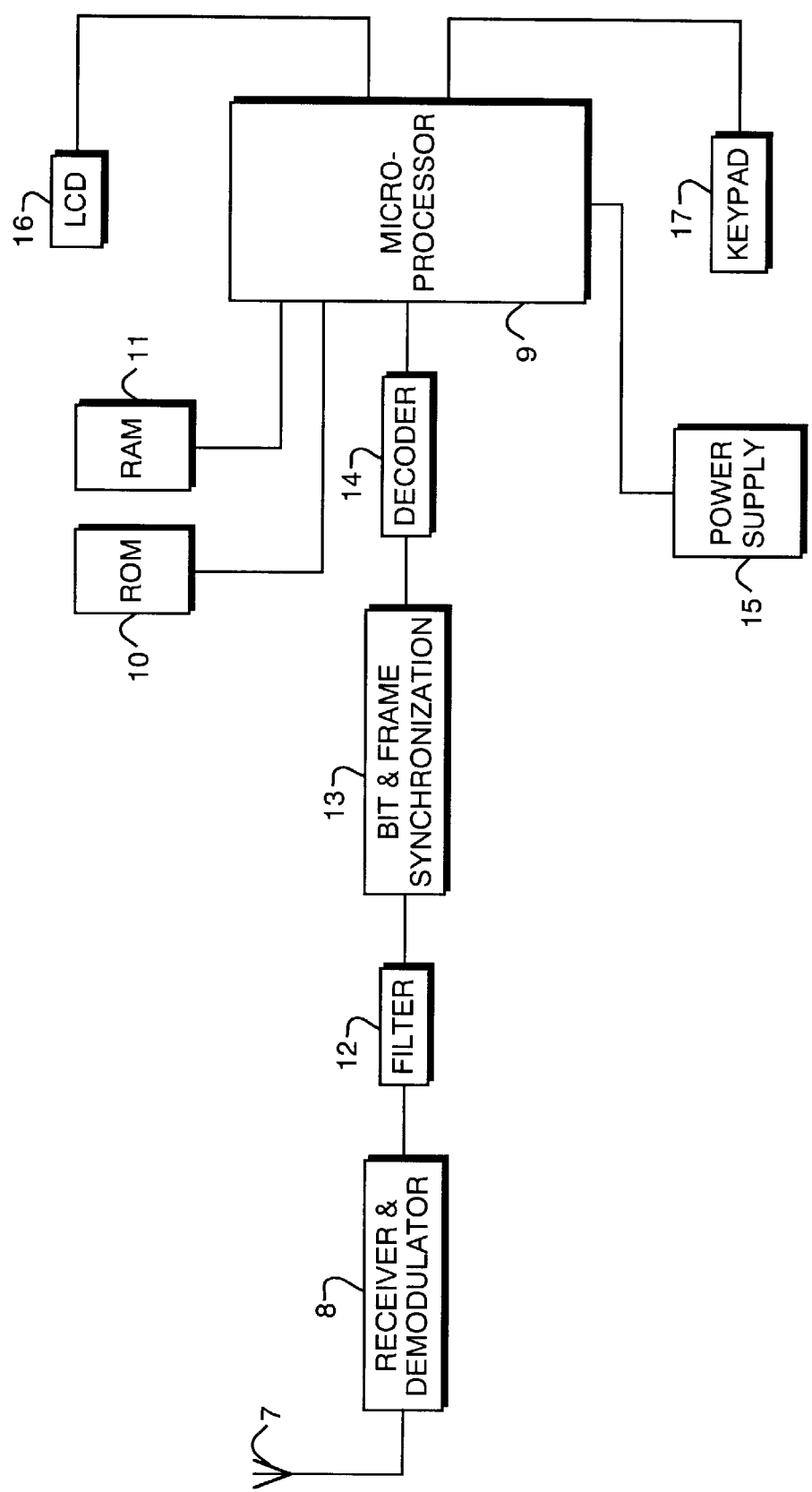
FIG. 2 is a schematic diagram showing a messaging centre of the system shown in FIG. 1.
Figure 3:
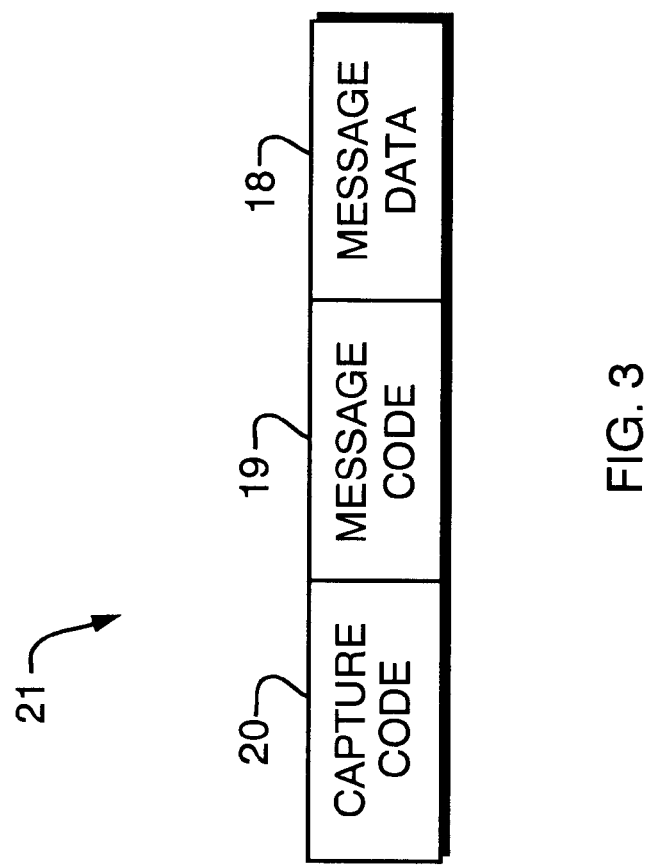
FIG. 3 is a representation of a message received by a public access messaging centre in the system.

Referring now to FIG. 1 a public access messaging system 1 comprises a telephone network indicated generally by 2 connected via local area telephone exchanges 3 to 2 subscriber and public telephones indicated generally at 4. The telephone network is also connected to a radio paging network comprising radio transmitters 5. Public access messaging centres indicated generally at 6 are distributed within range of the transmitters.

Where the system makes use of the POCSAG radio-paging standard the messaging centres 6 includes an antenna 7, a receiver and demodulator 8 together with a microprocessor 9 and its ROM 10 and RAM 11 memories. Also, a filter 12, bit and frame synchronisation circuitry 13, and a decoder 14; as shown in FIG. 2. External power supplies 15 provide low voltage power to the circuits and processors, and the entire centre is housed within an impact resistant body measuring approximately 330×160×100 mm (w×h×d). An LCD display 16 is provided on an easily accessible face of the messaging centre 6 together with a keypad 17 for user entry.

A person wishing to send a message or information to one or more of the messaging centres, delivers the information and details about the destination to the paging network service providers by conventional written, verbal or tone modulation means. The message could be delivered via the internet. The sender must also provide a message code in approved 8-digit format. The information or message data 18 is composed together with the message code 19, and a capture code 20 which identifies the messaging centres which are to receive the message. The assembled message 21 is then encoded and transmitted by the paging service provider across the paging network. An automated voice response system could be utilised to deliver the message to the paging service, and alphabet mapping of the standard telephone keypad could be employed to directly enter recipient information and the body of the text.

Messaging centres within the paging area receive the message 21, but only those programmed to recognize the capture code 20 will decode and further process the message. The received messages 21 are time-stamped and stored in a database in RAM 11. The database software is stored in ROM 10 and creates a filename based on the message code 19 transmitted with the message and then stores the message data 18 in a file with a name, as a message record.

A person wishing to read the message is able to do so by entering the correct identity code by keypad 17. The entered code must correspond in some way to the message code, for instance exact correspondence, and the message will then be displayed on the LCD where it can be viewed by the recipient.

If more than one message is received with the same message code, the software will, after time-stamping later messages, append them to earlier messages and store them in the same file. Messages with the same message code will form separate records within the same file. The messages may be deleted, either after they have been read out (or retrieved), or after a predetermined period of time has elapsed after their receipt.

It is possible to update, modify, delete and generally manipulate some programs stored in the messaging centre, via commands sent over the radio paging network.

Some messages may be available to more than one recipient, for instance a class of recipients such as company employees may all be able to access some messages intended for them. Each employee would be able to access the messages at any convenient messaging centre, and would not require any personal hardware. It is also possible that some messages will be generally accessible, or may be displayed publicly at the message centre on a large format display. Such messages may be informational in character and may direct users to seek further information by entering a further message code which is displayed. The messaging centres may also routinely hold some types of community information, such as the relative location of the nearest public telephone, in a readily accessible form.

Although the invention has been described with reference to a particular embodiment it should be appreciated that the messaging centres may be enhanced with much greater sophistication than that described. For instance, they may be equipped with text-to-voice synthesisers to enable an earphone or speaker interface with message recipients. Printer drivers may also be incorporated, to allow a hard copy of the message to be delivered to the recipient, and if required the printers may be coin-freed. Also, although an 8-digit message code has been described, any other number of digits may be used. Furthermore, an alphanumeric keypad may be provided on the messaging centres and the message code can also include letters or other characters in addition to, or instead of numbers.

Another enhancement would be the integration of a magnetic swipe reader which may be used to allow access to messages with greater security, or to allow the debiting of debit or credit cards.

In general it is envisaged that the senders will be billed for using the paging service. The cost could be calculated according to the number of messages sent, regardless of the number of intended or actual recipients. The billing may be on a credit or debit account basis or via the user's telephone account. Alternatively the receiver or owner of the messaging centre may be charged.

What is claimed is:

1. A public access messaging centre for receiving broadcast messages, each of which includes information for one or more particular recipients, and a separate message code, said message code agreed in advance between the sender and the recipients and included at the time the message is composed by the sender; the messaging centre comprising:
   receiver means arranged to receive a broadcast message and to store it without making the information in it available to anyone;
   processing means to use the message code in a stored message to enable the respective information to be released;
   data entry means operable by a member of the public for entering an identity code; and
   message delivery means to release the information from said stored message to said member of the public only when the processing means processes a said identity code corresponding to the included message code.

2. The public access messaging centre of claim 1, which makes use of existing paging system technology for receiving said broadcast messages.

3. The public access messaging centre of claim 1, which makes use of POCSAG-compliant radio paging systems connected to the existing public switched telephone network (PSTN).

4. The public access messaging centre of claim 1, wherein said messages are composed with at least one capture code, each said capture code corresponding to a specific destination area, and messages received will only be retained if the messaging centre is programmed to receive messages with said capture code.

5. The public access messaging centre of claim 1, wherein the message code is used to designate the intended recipient.

6. The public access messaging centre of claim 5, wherein the identity code is a PIN number to be entered into the messaging centre by the intended recipient.

7. The public access messaging centre of claim 1, wherein the message code designates a class of recipients.

8. The public access messaging centre of claim 7, wherein public messages are received and displayed without requirement of a said identity code by the message centre.

9. The public access messaging centre of claim 8, wherein the message centre is equipped with large format public display for the convenient display of received messages.

10. The public access messaging centre of claim 1, wherein on receipt at the messaging centre, a message is time-stamped and stored in a database as a record.

11. The public access messaging centre of claim 10, wherein a subsequent message with the same message code is appended to a pre-existing message and stored as an additional record within a file with a name corresponding to the message code.

12. The public access messaging centre of claim 10, wherein messages are deleted from the database the earlier of when they have been read out or after a predetermined period of time has elapsed.

13. The public access messaging centre of claim 1, further comprising a text-to-voice synthesizer and speaker.

14. The public access messaging centre of claim 1, further comprising a means for printing said message data.

15. A public access messaging system comprising at least one public access messaging centre for receiving broadcast messages each of which includes information for one or more particular recipients and a separate message code, said message code agreed in advance between the sender and the recipients and included at the time the message is composed by the sender; said messaging centre comprising:

receiver means arranged to receive a broadcast message and to store it without making the information in it available to anyone;

processing means to use the message code in a stored message to enable the respective information to be released;

data entry means operable by a member of the public for entering an identity code; and message delivery means to release the information from said stored message to a said member of the public only when the identity code corresponds to the message code.

16. The public access messaging system of claim 15, which makes use of existing paging system technology for receiving said broadcast messages.

17. A method of operating a public access messaging system including at least one messaging centre located in a public place to receive broadcast messages each of which includes information for one or more particular recipients and a separate message code, the method comprising the steps of:

composing a message consisting of message data and a said message code, said message code agreed in advance between the sender and the recipients of the message;

transmitting the message;

receiving the message at said messaging centre;

storing the message data in conjunction with the message code without making the message data available to anyone; and releasing the message data to a member of the public only when an identity code corresponding to said message code is entered by said member at the said messaging centre.

18. The method of operating a public access messaging system of claim 17, comprising the additional steps of adding a capture code to the message before transmission, said capture code corresponding to a specific destination area, retaining at said message centre only such messages carrying a said capture code for which said messaging centre has been programmed to recognize.

* * * * *